US010970713B2

(12) United States Patent
Ball et al.

(10) Patent No.: US 10,970,713 B2
(45) Date of Patent: Apr. 6, 2021

(54) MULTI-SCHEME PAYMENT INTEGRATED CIRCUIT CARD, PAYMENT SYSTEM, AND PAYMENT METHOD

(71) Applicant: SCRAMCARD HOLDINGS (HONG KONG) LIMITED, Queensland (AU)

(72) Inventors: David Ball, Queensland (AU); Simon Hewitt, Queensland (AU)

(73) Assignee: SCRAMCARD HOLDINGS (HONG KONG) LIMITED, Queensland (AU)

(*) Notice: Subject to any disclaimer, the term of this patent is extended or adjusted under 35 U.S.C. 154(b) by 1055 days.

(21) Appl. No.: 15/123,107

(22) PCT Filed: Feb. 25, 2015

(86) PCT No.: PCT/AU2015/000106
§ 371 (c)(1),
(2) Date: Sep. 1, 2016

(87) PCT Pub. No.: WO2015/131225
PCT Pub. Date: Sep. 11, 2015

(65) Prior Publication Data
US 2017/0068951 A1    Mar. 9, 2017

(30) Foreign Application Priority Data
Mar. 4, 2014  (AU) ................ 2014900713

(51) Int. Cl.
*G06Q 40/00*    (2012.01)
*G06Q 20/34*    (2012.01)
(Continued)

(52) U.S. Cl.
CPC ......... *G06Q 20/3572* (2013.01); *G06Q 20/02* (2013.01); *G06Q 20/0855* (2013.01);
(Continued)

(58) Field of Classification Search
USPC ........................................ 235/379
See application file for complete search history.

(56) References Cited

U.S. PATENT DOCUMENTS 5,590,038 A  12/1996  Pitroda
7,784,687 B2  8/2010  Mullen et al.
(Continued)

FOREIGN PATENT DOCUMENTS

WO    01/93212 A2   12/2001

*Primary Examiner* — Jamara A Franklin
(74) *Attorney, Agent, or Firm* — AEON Law, PLLC; Adam L. K. Philipp; Jonathan E. Olson

(57) ABSTRACT

A system for effecting electronic payments via multiple payment schemes from a single payment integrated circuit (IC) card includes a payment IC card conforming to a payment card standard, the payment IC card being issued with a plurality of primary account numbers (PANs) from the payment card standard; a wallet server storing account details of one or more payment schemes with which a user has an account; and a vendor payment system configured to accept transactions using the payment card standard. The payment IC card is operable to transact with the vendor payment system using the payment card standard. The vendor payment system is operable to provide to the wallet server one of the PANs issued to the payment IC card to effect a financial transaction via one of the payment schemes with which the user has an account.

24 Claims, 12 Drawing Sheets

(51) Int. Cl.
  *G06Q 20/20* (2012.01)
  *G06Q 20/22* (2012.01)
  *G06Q 20/40* (2012.01)
  *G07F 7/08* (2006.01)
  *G06Q 20/12* (2012.01)
  *G06Q 20/38* (2012.01)
  *G06Q 20/36* (2012.01)
  *G06Q 20/02* (2012.01)
  *G06Q 20/08* (2012.01)

(52) U.S. Cl.
  CPC ............. *G06Q 20/12* (2013.01); *G06Q 20/20* (2013.01); *G06Q 20/227* (2013.01); *G06Q 20/341* (2013.01); *G06Q 20/36* (2013.01); *G06Q 20/363* (2013.01); *G06Q 20/385* (2013.01); *G06Q 20/4012* (2013.01); *G07F 7/0846* (2013.01); *G07F 7/0853* (2013.01)

(56) References Cited

U.S. PATENT DOCUMENTS

| | | | |
|---|---|---|---|
| 8,265,998 B2* | 9/2012 | Chenot | G06Q 20/10 235/380 |
| 2003/0155416 A1* | 8/2003 | Macklin | G06Q 20/346 235/380 |
| 2006/0287964 A1 | 12/2006 | Brown | |
| 2008/0021829 A1 | 1/2008 | Kranzley | |

* cited by examiner

MULTI-SCHEME PAYMENT INTEGRATED CIRCUIT CARD, PAYMENT SYSTEM, AND PAYMENT METHOD

FIELD OF INVENTION

The present invention relates to integrated circuit cards, systems, and methods for effecting financial transactions. The present invention has particular but not exclusive application for use with electronic payment methods.

BACKGROUND OF THE INVENTION

It is not uncommon for people to possess more than one credit, debit, or other electronic payment card. Owning more than one electronic payment card inevitably results in a person having to carry with them each of such cards. Carrying multiple cards is, however, rather inconvenient.

One solution to carrying multiple cards is to embed in a single card multiple primary account numbers (PAN), one for each payment scheme to be provided by the one card. Such a solution, however, requires each of the payment schemes (for example, Visa™, Mastercard™, American Express™, and the like) to agree to cooperate and collaborate. For various reasons, including each scheme wanting to maintain and promote individual branding and identity, such a solution is unfeasible.

OBJECT OF THE INVENTION

It is one object of the present invention to provide a multiple payment scheme integrated circuit card that is operable to facilitate electronic payments via a number of different payment schemes using existing electronic financial systems and without requiring the collaboration of each of the different payment schemes.

This and other objects of the present invention will be made apparent from the following disclosure of the invention.

SUMMARY OF THE INVENTION

According to a first aspect of the present invention, a system for effecting electronic payments via multiple payment schemes from a single payment integrated circuit (IC) card is provided. The system comprises a payment IC card conforming to a payment card standard, the payment IC card being issued with a plurality of primary account numbers (PANs) from the payment card standard; a wallet server storing account details of one or more payment schemes with which a user has an account; and a vendor payment system configured to accept transactions using the payment card standard, wherein the payment IC card is operable to transact with the vendor payment system using the payment card standard, and the vendor payment system is operable to provide to the wallet server one of the PANs issued to the payment IC card to effect a financial transaction via one of the payment schemes with which the user has an account.

Preferably, the wallet server is connected to financial systems of each payment scheme with which the user has an account.

Preferably, the wallet server is operable to provide the account details of the payment scheme the user intends to conduct a transaction with to a corresponding financial system of the payment scheme to request payment from the user to the vendor payment system.

Preferably, the wallet server is operable to receive from the financial system an approval or rejection of the request for payment, and inform the vendor payment system of the same.

Preferably, the payment IC card is provided with a plurality of presets, each preset being associate with one of the plurality of PANs issued to the payment IC card.

Preferably, the wallet server is accessible by the user to pair each payment scheme whose details are stored therein with a preset, and the wallet server is further operable to generate an activation code for the pairing.

Preferably, the payment IC card is operable by the user to indicate by which payment scheme the user intends to conduct the transaction.

Preferably, the payment IC card is operable to receive from the user an indication of a preset of the payment IC card to activate, and a code for activating the preset, and further operable to compare the received code with the activation code.

Preferably, the payment IC card, upon activation of a preset, is operable to provide to the wallet server the PAN associated with the preset.

Preferably, the wallet server, upon receipt of the PAN associated with the preset, is operable to retrieve the account details of the payment scheme paired to the present, and provide the account details to the financial system of a corresponding payment scheme.

Preferably, the payment IC card is provided with a display, the display is operable to display one of the plurality of PANs, or a portion thereof, upon operation of a preset and input of a security code by the user.

Preferably, the payment IC card is further operable to receive a PIN entered by the user, and generate a card code verification number based on the received PIN.

According to a second aspect of the present invention, there is provided a payment integrated circuit (IC) card configured to realize payment via one or more payment schemes. The payment IC card comprises one or more user activatable presets, each paired to a unique PAN issued by a payment card standard, wherein the payment IC card is configured to produce the unique PAN paired to a preset upon an authorized operation of the preset.

Preferably, the payment IC card is configured to operate in a first mode where a PIN is received from a user, and the payment IC card generates a security number using the received PIN, a current time, the preset being operated, and a pre-stored random seed.

Preferably, the payment IC card is further adapted, in the first mode, to produce an extension number for combining with a partial card number to produce the unique PAN paired with the preset being operated.

Preferably, the payment IC card is further configured to operate in a second mode where the payment IC card is inserted into a card reader, and a unique PAN paired to a preset being operated is read from the payment IC card and sent by the card reader to a server, the server being managed by an issuer of the payment IC card.

Preferably, the payment IC card is further configured to operate in a third mode where the user validates their authority with the payment IC card, and upon validation the payment IC card unlocks an NFC communication mode allowing a unique PAN paired to a preset being operated to be sent via NFC communication to an NFC card reader, and thereby to a server, the server being managed by an issuer of the payment IC card.

Preferably, the payment IC card is preprogrammed with an activation code for activating each of the presets.

Preferably, the payment IC card is operable to receive an activation code from the user to activate a preset for use with a predetermined electronic payment scheme. The electronic payment scheme may be a payment scheme matching the payment standard, or may be a payment scheme different to that of the payment standard.

Preferably, the payment IC card is operable to determine from the activation code a type of payment scheme being activated therewith.

Preferably, the payment IC card comprises a display.

Preferably, the payment IC card comprises a keypad.

Preferably, the payment IC card comprises an interface for interfacing a processor of the card with a card reader.

Preferably, the payment IC card has presented on a surface thereof part of the card number.

According to a third aspect of the present invention, a method for conducting an electronic funds transaction over any one of a plurality of payment schemes from one payment IC card is provided. The method comprises the user pairing a payment scheme account with a preset on a server, the server generating an activation code for the pairing, and the user entering the activation code into the payment IC card in relation to a corresponding preset on the payment IC card, wherein a transaction operation involving the payment IC card causes a PAN associated with the preset to be sent to the server, and causes the server to send details of the payment scheme account paired with the preset identified by the PAN to a financial system of a payment scheme corresponding to the payment scheme account Preferably, the method, in one form, receives an input from a user indicating if a transaction to be conducted is a remote transaction or a point-of-sale transaction.

Preferably, the method, when applied to a remote transaction, comprises receiving an input from the user to indicate which preset is to be used for the remote transaction, receiving a PIN from the user, and producing for the user a PAN or a part thereof, together with a security number, wherein the PAN is one of a plurality of PANs pre-issued by a payment standard to the payment IC card, and the security number is generated from the PIN.

Preferably, the method, when applied to a remote transaction, further comprises providing the PAN and the security number to a vendor set up to conduct transaction using the payment standard.

Preferably, the method, when applied to a remote transaction, further comprises the vendor processing the transaction in accordance with procedures set by the payment standard, and providing the PAN and security number to the server.

Preferably, the method, when applied to a remote transaction, further comprises the server determining from the PAN which preset the user has selected, determining which payment scheme account has been paired with the preset, and providing to the financial system of the payment scheme corresponding to the payment scheme account details of the payment scheme account.

Preferably, the method, when applied to a point-of-sale transaction, comprises receiving an input from the user to indicate which preset is to be used for the point-of-sale transaction, receiving an authorizing PIN from the user, reading the payment IC card using a card reader, and providing a PAN corresponding to the preset to the server.

Preferably, the method, when applied to a point-of-sale transaction, further comprises the server determining from the received PAN which preset the user has selected, determining which payment scheme account has been paired to the preset, and providing to the financial system of the payment scheme corresponding to the payment scheme account details of the payment scheme account.

Preferably, the method, when applied to an NFC transaction, comprises receiving an input from the user to indicate which preset is to be used for the NFC transaction, receiving an authorizing PIN from the user, unlocking an NFC communication means integrated in the payment IC card upon validation of the authorizing PIN, transmitting a PAN corresponding to the preset via NFC to an NFC card reader, and providing the PAN to the server.

The above aspects, variations, and options are to be understood as comprisable within the invention singly, or in combination with each other.

BRIEF DESCRIPTION OF THE DRAWINGS

In order that the present invention can be more readily understood, reference will now be made to the accompanying drawings which illustrate preferred embodiments of the invention and wherein.

DETAILED DESCRIPTION OF PREFERRED EMBODIMENTS

Figure 1:
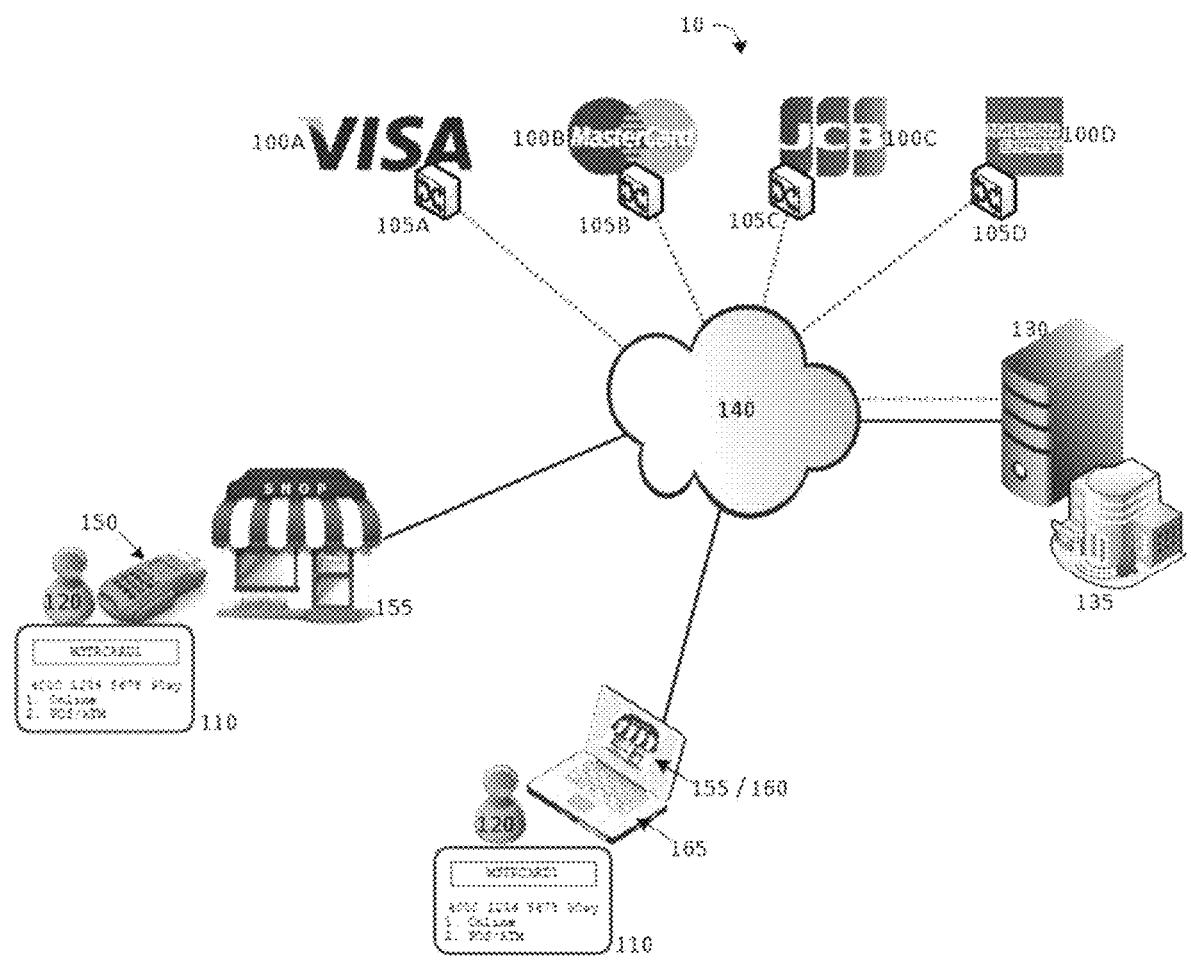
FIG. 1 illustrates a multi-scheme payment system according to the present invention.

With reference to FIG. 1, a multi-scheme payment system 10 according to a first aspect of the present invention is described.

The multi-scheme payment system 10 is a system for facilitating electronic payments, such as credit and debit card payments. The system 10 allows users 120 to make electronic payments using any one of a number of payment schemes 100A, 100B, 100C, 100D with which the users 120 have accounts. The electronic payments are effected from a single payment integrated circuit card 110 (hereinafter referred to as a payment IC card 110), regardless of the payment scheme 100A-D used.

The system 10 includes a wallet server 130 connected to a network 140. The wallet server 130 is managed by a wallet provider 135 and stores therein a wallet account for each user 120. Each user's wallet account stores details for each payment scheme 100A-D that the user 120 has an account with. In one form, each user wallet account stores one or more of the name, primary account number, card type, expiry date, and card code verification number (e.g. CCV2), for one or more credit or debit cards (e.g. cards corresponding to each of payment schemes 100A-D) that the user 120 owns.

A point-of-sale (POS) device 150 belonging to a vendor 155 and/or an online payment portal 160 accessible via an electronic device 165 are connected to the wallet server 130 via the network 140. The POS device 150 is preferably an NFC (Near Field Communication) enabled device, and accordingly operable to read the payment IC card 110 via both NFC communication and physical hardware interfacing. Also connected to the wallet server 130 via the network 140 are financial systems 105A, 105B, 105C, 105D for the one or more payment schemes 100A-D supported by the wallet server 130.

The payment IC card 110 is an integrated circuit (IC) card issued by the wallet provider 135. The payment IC card 110 conforms to a payment IC card standard. In one form, the payment IC card 110 conforms to the EMV (Europay™, Mastercard™, and Visa™) standard. Accordingly, the payment IC card 110 is accepted at any terminal, machine, and/or vendor that is registered appropriately for EMV transactions.

As will be described in greater detail below, the payment IC card 110 is issued with one or more primary account numbers (PANs) from the payment standard. Each PAN is stored in correspondence with a selectable preset of the wallet card 110. The PANs identify to the wallet server 130 a payment scheme 100A-D desired to be used by the user 120 to perform a transaction. The PANs stored in the payment IC card 110 are communicated to the wallet server 130 by way of, for example, the POS device 150 (either by NFC communication or physical hardware interfacing), or by the user 120 providing the PANs through the payment portal 160, or by any other form of communication including telephone, verbally written form, and the like.

As will be described in greater detail below, a financial transaction between the user 120 and the vendor 155 is realized by the user 120 operating the payment IC card 110 to indicate which payment scheme the user 120 desires to conduct the transaction with. A PAN corresponding to a preset activated for the desired payment scheme is sent to the wallet server 130, for example via the POS device 150 or the payment portal 160. The wallet server 130, upon receiving the PAN, determines which of the payment schemes 100A-D the user 120 desires to conduct the transaction with. Once the desired payment scheme is identified, the wallet server 130 retrieves the actual user details for the desired payment scheme from the user's wallet account. In an exemplary case where the user 120 desires to transact via the VISA™ payment scheme, for example, the user's VISA™ primary account number, VISA™ card expiry date, and the like are retrieved from the user's wallet account. These details are then transmitted by the wallet server 130 to the financial systems 105A of the VISA™ payment scheme 100A.

Figure 2:
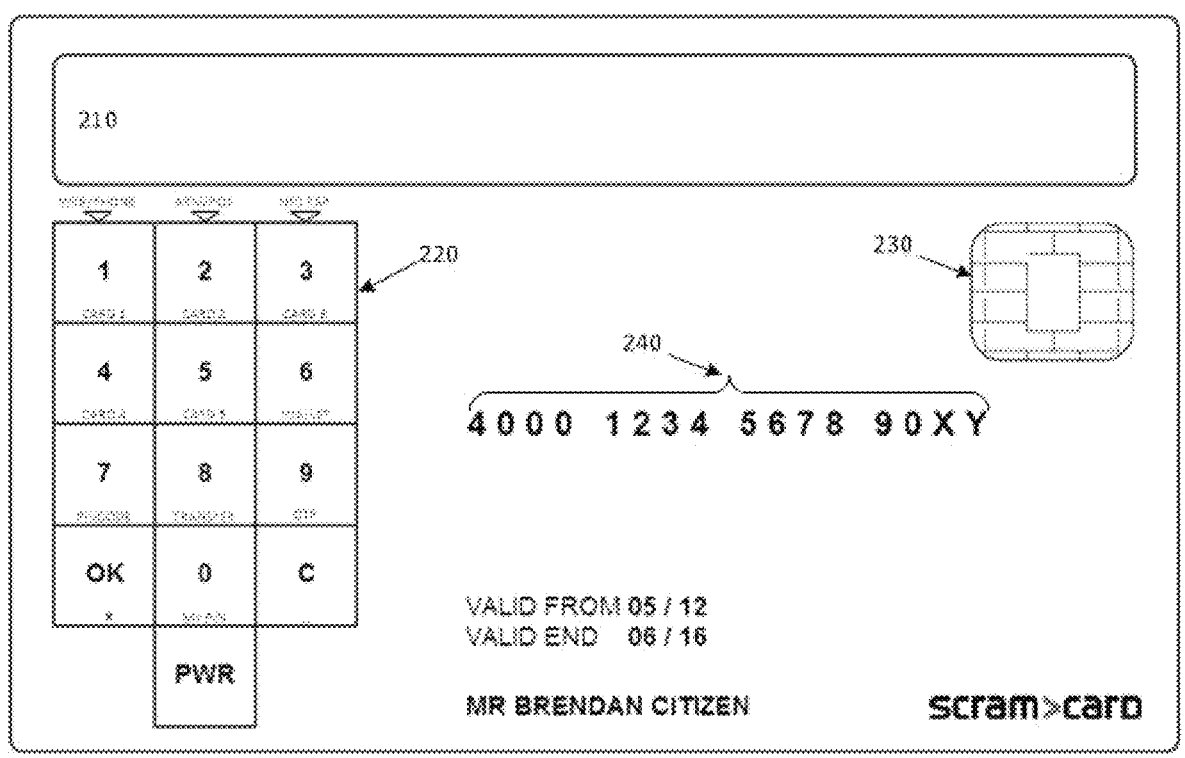
FIG. 2 illustrates a multi-scheme payment integrated circuit card according to the present invention.

With reference to FIG. 2, the payment IC card 110 is described in greater detail. The payment IC card 110 is an integrated circuit card including a display 210, and keypad 220. The payment IC card 110 integrates therein a processor and memory to perform a range of functions. An interface chip 230 is provided to interface the processor and memory with external devices, such as the POS device 150. Software and/or firmware is stored in the memory of the payment IC card 110 to provide various user functions. These user functions will be described in greater detail below. Other hardware may be integrated in the payment IC card 110, including for example NFC communication hardware, Bluetooth™ communication hardware, backlighting, and the like.

The display 210 is operable to display thereon user prompts, user inputs, card generated outputs, and other information for the user 120. The display 210 in one form is a liquid crystal display. In other forms, the display 210 may be an LED display, OLED display, ELD, electronic paper display, and the like.

The keypad 220 allows interaction with the software and/or firmware programs stored in the memory of the payment IC card 110. As will be detailed below, the keypad 220 acts as an interface for the user 120 to activate a new payment scheme in the payment IC card 110, deactivate an existing payment scheme therefrom, enter in a PIN, and the like.

One surface of the payment IC card 110 is detailed with a payment IC card number 240. The payment IC card number 240 contains a plurality of digits with at least one digit being variable and represented on the surface algebraically. In the embodiment illustrated in FIG. 2, the payment IC card number 240 has 16 digits, of which the last two digits are variable and represented algebraically as 'X' and 'Y' on the card surface. Each activatable button on the key pad 220 of the payment IC card 110 may be mapped to a payment IC card extension number. The payment IC card extension numbers of each activatable button replace the variable digit(s) 'X' and 'Y' to form a PAN, unique to each button, which has been issued to the wallet card 110 by the payment standard.

While various elements of the payment IC card 110 have been illustrated in a certain arrangement in FIG. 1, it is to be understood that the illustration of FIG. 1 is not limiting. A skilled addressee will understand that the various elements, for example the key pad 220, may be arranged in other positions on the payment IC card 110, such as on a back surface thereof.

Figure 3:
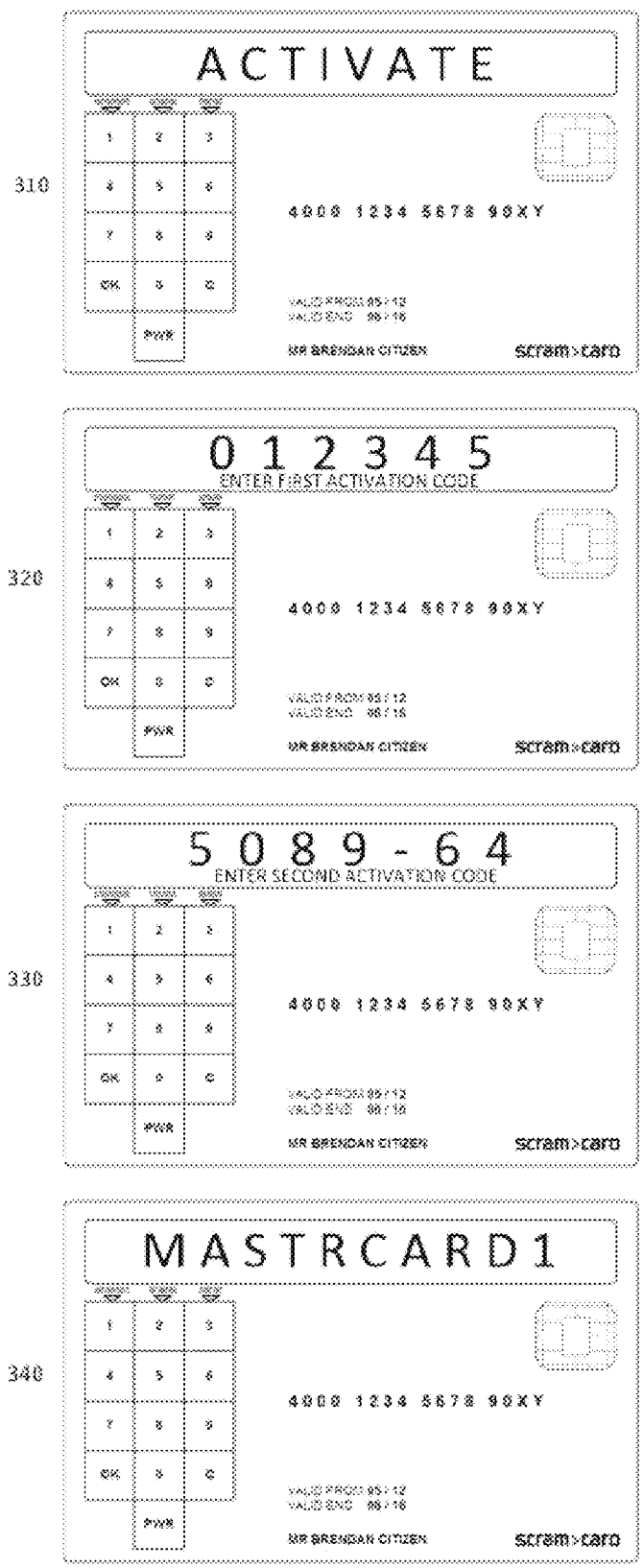
FIG. 3 illustrates displays of the multi-scheme payment integrated circuit card in an ACTIVATE mode.
Figure 4:
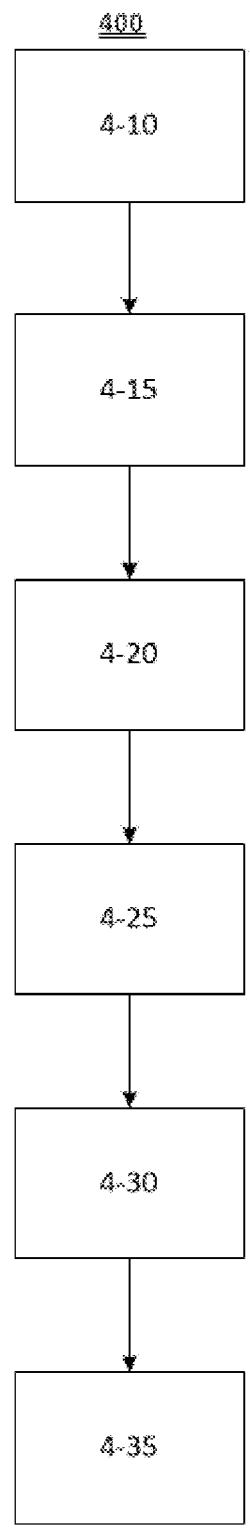
FIG. 4 is a flow chart describing an ACTIVATE operation.

With reference to FIGS. 3 and 4, an activation operation 400 of the payment IC card 110 to activate a button of the payment IC card 110 for a payment scheme account is described. The activation operation 400 is performed in tandem with an online or telephone based operation in which the user 120 indicates to the wallet server 130 which of the user's payment scheme accounts should be associated with which buttons of the payment IC card 110.

For ease of description, the following operation 400 is described in relation to an example where the user 120 has indicated to the web server 130 that they desire to activate button '4' on their payment IC card 110 for use with their Mastercard™ account. It should be understood that the following operation 400 is applicable regardless of which button of the payment IC card 110 is desired to be activated, and regardless of which payment scheme the button is to be activated for.

The operation 400 to activate button '4' of the payment IC card 110 for use with the user's Mastercard™ payment scheme account commences at 4-10, after or in tandem with the user 120 performing the aforementioned tandem operation to indicate such to the wallet server 130. At 4-10, the user 120 presses button '4' on the keypad 220 to commence the operation 400.

At 4-15, the display 210 of the payment IC card 110 displays a suitable message to inform the user 120 that they have commenced an activation operation. The display 210 may, for example, display the word "ACTIVATE" as illustrated by screen 310 of FIG. 3 to indicate to the user that button '4' is available as a suitable candidate for activation.

At 4-20, a screen 320 (FIG. 3) prompts the user 120 to enter in a first activation code. The first activation code is provided to the user 120 by the wallet server 130 during the aforementioned tandem operation, and is specific to button '4'. The first activation code is entered into the payment IC card 110 by the user 120 by way of the keypad 220. The screen 320 (FIG. 3) is operable to display the digits as they are entered by the user 120 via the keypad 220. The activation code validates the user's authority to activate button '4' of the payment IC card 110. The requirement for a first activation code prevents erroneous and/or unauthorized activation of the buttons. Specifically, the correct first authorization code is only known to the person who performed the aforementioned tandem operation with the wallet server 130, or an authorized delegate of that person.

At 4-25, the processor of the payment IC card 110 checks if the code entered by the user is valid. If the code is determined to be invalid, the activation operation 400 is concluded. If the code is determined to be valid, the operation proceeds to 4-30.

At 4-30, the display 210 of the payment IC card 110 displays a screen 330 (FIG. 3) to prompt the user 120 to enter a second activation code. The second activation code is also provided to the user by the wallet server 130 during the aforementioned tandem operation. The second activation code acts as a further check against erroneous and/or unauthorized button programming. The second activation code is entered by the user 120 by way of the keypad 220.

In one form, the second activation code is comprised of two parts. A first part of the code includes the activation sequence. A second part of the code identifies to the payment IC card 110 the payment scheme (e.g. Mastercard™, Visa™, AMEX™) that the button is being activated for. In the example illustrated in the screen 330 of FIG. 3, the second activation code is a 6 digit number where the first four digits are a activation sequence generated by the wallet server 130, and the last two digits indicate to the payment IC card 110 the type of payment scheme being linked to the button.

At 4-35, the processor of the payment IC card 110 checks if the code entered by the user 120 is valid for button '4', and if so, activates for button '4' for use with the user's Mastercard™ account. The payment IC card 110 further associates a display name to be displayed on the display 210 each time button '4' is now pressed. The display name to be displayed is based on the second activation code.

Specifically, the display name is determined from the second part of the second activation code. An exemplary mapping of the second part of the second activation code to various payment schemes may be as follows:

| Last 2 Digits | | | | | | | | |
|---|---|---|---|---|---|---|---|---|
| 06 | 16 | 23 | 45 | 57 | 64 | 79 | 85 | 91 |
| Payment Scheme Maestro | JCB | Electron | VISA DR | VISA CR | Mastercard | AMEX | Diners | UnionPay |

Accordingly, any second activation code ending in "64" would be identified by the payment IC card 110 as a Mastercard™ account, and an appropriate display name of, for example "MASTRCARD1" is displayed on the display 210 each time the activated button is pressed. An exemplary screen 340 of the payment IC card 110 depicting the display name is illustrated in FIG. 3. It is to be understand that the second part of the second activation code is not limited to being the last 2 digits, as in the example illustrated in FIG. 3. The second part of the second activation code may be any predetermined derivation of the second activation code.

Figure 5:
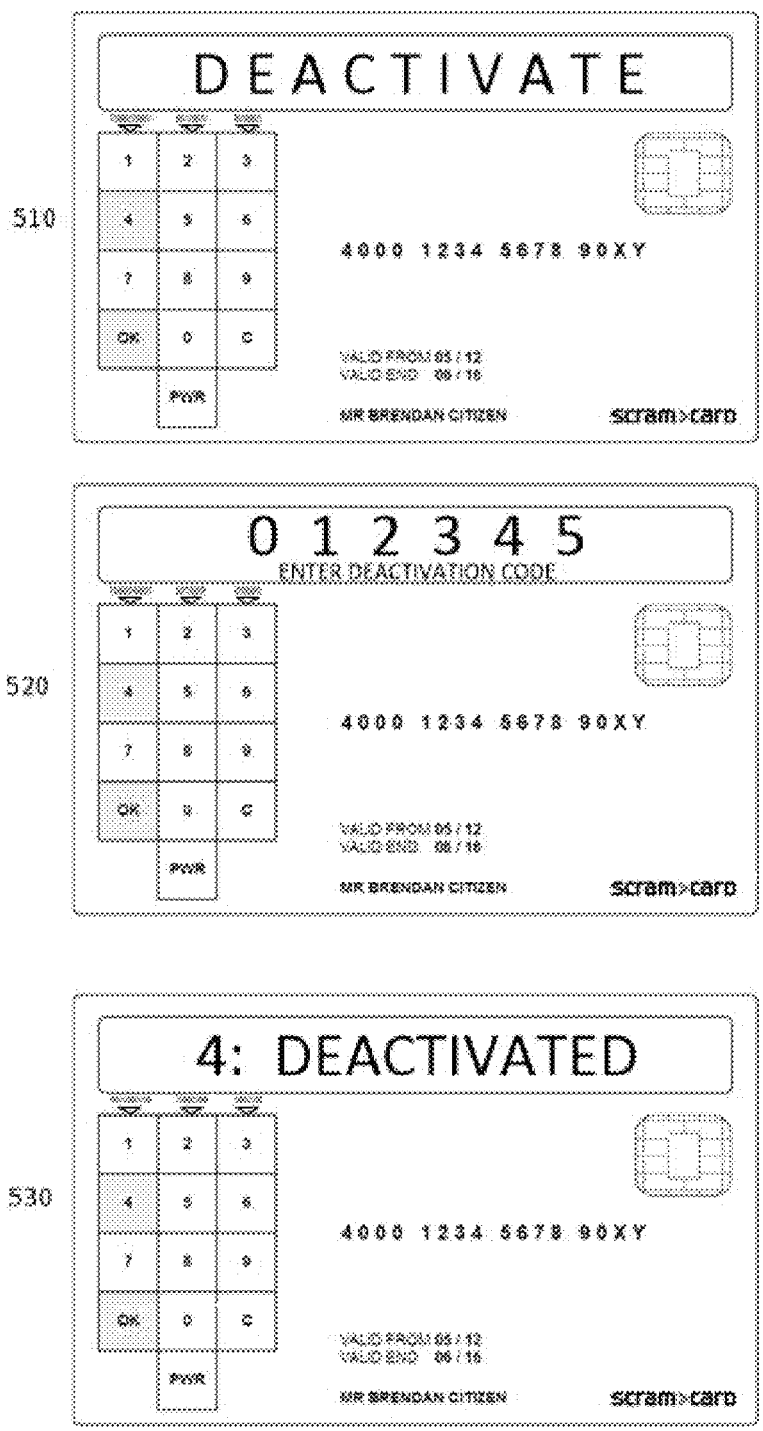
FIG. 5 illustrates displays of the multi-scheme payment integrated circuit card in a DEACTIVATE mode.
Figure 6:
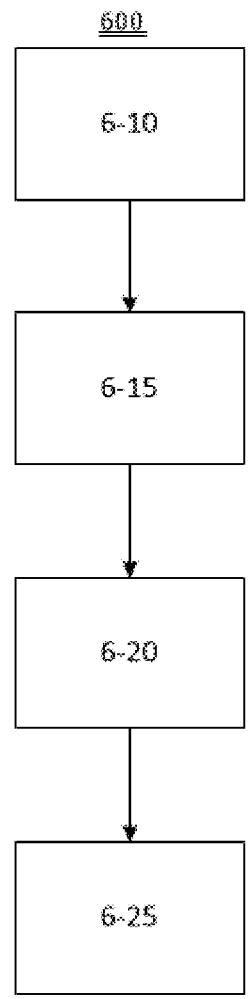
FIG. 6 is a flow chart describing a DEACTIVATE operation.

With reference now to FIGS. 5 and 6, an operation 600 for deactivating a payment scheme account from the payment IC card 110 is described.

The operation 600 to deactivate a payment scheme account from the payment IC card 110 commences at 6-10 in the flowchart of FIG. 6 when the user 120 presses a preset sequence of buttons on the keypad 220. In one form, the sequence of buttons is a first press of the button to be deactivated followed by 5 consecutive presses of the "OK" button in quick succession.

At 6-15, the display 210 of the payment IC card 110 displays a suitable message to inform the user 120 that a deactivation operation is permitted for the button and that the payment IC card 110 is ready to commence the deactivation process. In one form, the display 210 displays the word "DEACTIVATE" as illustrated in FIG. 5 with reference to screen 510.

At 6-20, the user 120 enters into the payment IC card 110 a deactivation code provided to them by the wallet provider. The deactivation code is provided to the user 120 when the user 120 informs the wallet server 130 of their desire to deactivate a button. In one form, the user 120 informs the wallet server 130 of their desire to deactivate a button via online means, such as through a web portal, or via telephone. The deactivation code is entered by the user 120 by way of the keypad 220. A screen 520 (FIG. 5) prompts the user 120 to enter the deactivation code, and displays the digits as they are entered by the user 120. The deactivation code is specific to the button being deactivated.

At 6-25, the processor of the payment IC card 110 confirms if the deactivation code entered by the user 120 is valid for the button to be deactivated. If the code is valid, the button is deactivated, and future presses of the button will not result in the necessary processes for effecting a transaction. The deactivated button is also made available for future activation for new payment scheme accounts. The display 210 displays a screen 530 (FIG. 5) to confirm to the user 120 that the button has been delinked/deactivated.

Figure 7:
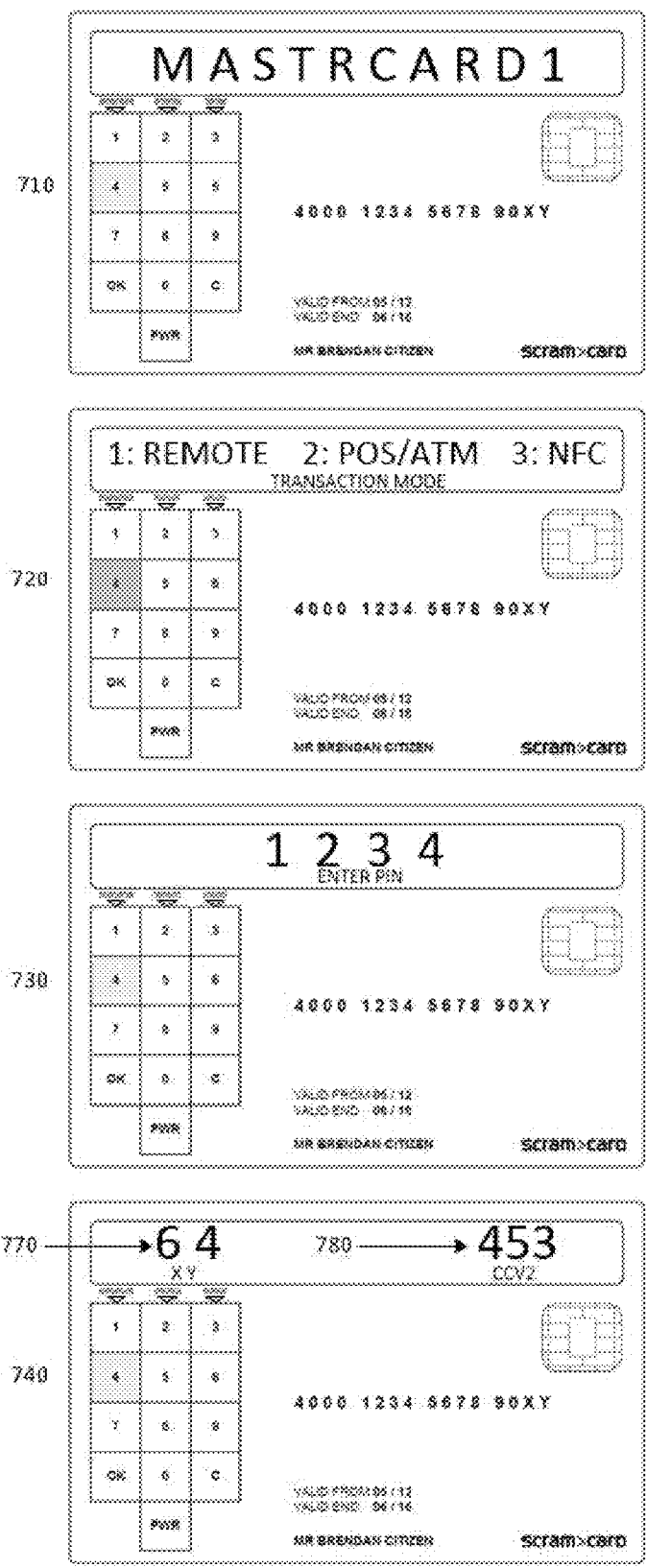
FIG. 7 illustrates displays of the multi-scheme payment integrated circuit card in a remote transaction mode.
Figure 8:
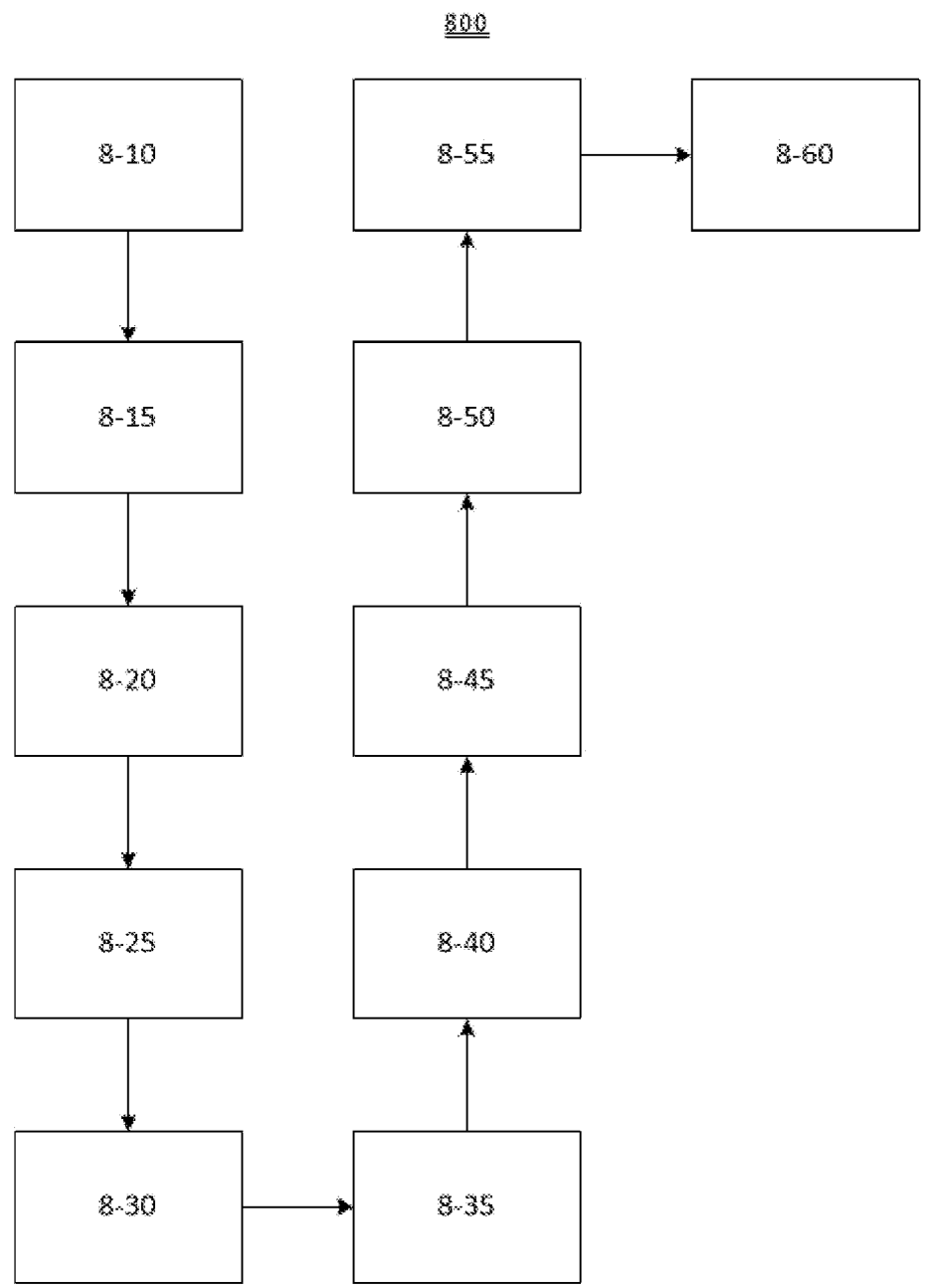
FIG. 8 is a flow chart describing a remote transaction operation using a multi-scheme payment integrated circuit card according to the present invention.

Referring to FIGS. 7 and 8, an operation 800 for making a remote transaction using the payment IC card 110 is described. A remote transaction, for the purposes of this description, is one where the payment IC card 110 is not physically presented to the vendor 155, such as when making an online purchase or a purchase over the telephone.

For convenience of description, it is assumed in the following description that the user 120 desires to effect payment by way of their Mastercard™ credit card which has been linked to button '4' of their payment IC card 110. It is to be understood, however, that the invention is not so limited, and that the following operation 800 is applicable regardless of which payment scheme is used, and which button of the payment IC card 130 is activated.

The operation 800 commences at 8-10, where the user 120 is prompted by the vendor 155 to provide their preferred payment details. The preferred payment details are, for example, a credit card number, cardholder's name, expiry date, and the like.

At 8-15, the user 120 selects one of the payment schemes 100A-D linked to the user's payment IC card 110 to effect payment. In this example, the user 120 presses button '4' using the keypad 220.

At 8-20, upon pressing button '4', the display 210 generates a screen 710 (FIG. 7) displaying "MASTRCARD1", to confirm to the user 120 that button '4' corresponds to their Mastercard™ account.

At 8-25, the user 120 indicates to the payment IC card 110 what kind of transaction is about to be made. Accordingly, the user 120 in this example indicates to the card that a remote transaction is to be made. This indication may be made by way of a manipulation of the keypad 220 in a known sequence. In a preferred form, the button '1' is pressed to indicate a remote transaction, as exemplarily illustrated by screen 720 (FIG. 7).

At 8-30, the user is subsequently presented with a screen 730 (FIG. 7) prompting the user 120 to enter in a PIN.

At 8-25, the user 120 enters in a PIN. Regardless of whether the entered PIN is valid or not, the user 120 is presented with a screen 740 (FIG. 7) displaying a payment IC card extension number 770 and a security number 780 such as a card code verification number (CCV2). The security number 780 is generated from a number of inputs, including the PIN, a random seed pre-stored in the payment IC card 110, the current time, and the button number pressed (in this case, button '4'). The payment IC card extension number 770 is a static, unchanging number assigned to button '4' of the payment IC card 110 and is mathematically correlated with the payment IC card number 240. The mathematical correlation between the payment IC card extension number 770 and the payment IC card number 240, in one form, is such that when the payment IC card extension number 770 replace the variable 'X' and 'Y' digits, the resulting payment IC card number 240 satisfies a Luhn (mod 10) algorithm.

At 8-40, the PAN paired with button '4' is formed from the payment IC card number 240 with the variable digits 'X' and 'Y' replaced by the payment IC card extension number 770. The PAN paired with button '4' and the security number 780 are provided to the vendor 155/160.

At 8-45, the vendor 155/160 enters the received PAN and the security number 780 into their payment system. The payment system recognizes from the full payment IC card number that the payment IC card 110 is an EMV card (or other acceptable card) issued by the wallet provider 135, and accordingly provides the PAN paired to button '4', security number, amount to be debited, and other payment details to the wallet server 130 for processing.

At 8-50, the wallet server 130 receives the PAN, the security number 780, the amount to be debited, and other payment details. From the PAN, the wallet server 130 determines that button '4' was pressed by the user 120. The wallet server 130 further determines if the provided security number 780 is valid. The wallet server 130 is able to validate the security number 780 as the wallet server 130 knows which button was pressed, the time of the transaction, the pre-stored random seed associated with the payment IC card 110, and the user's PIN associated with the Mastercard™ on button '4'. Accordingly, the wallet server 130 is in possession of the same information from which the security number 780 was generated, and can thereby verify the security number 780. If an incorrect PIN was entered at 8-20, the security number 780 sent to the wallet server 130 will not match the security number stored in relation to the user's Mastercard™ account for button '4'.

Upon successful validation of the security number 780, the wallet server 130 retrieves the account details for the user's Mastercard™ credit card that is linked with button '4', including the actual Mastercard™ primary account number, actual expiry date, actual CCV2 number, and the like.

At 8-55, the wallet server 130 provides the user's actual Mastercard™ primary account, actual CCV2 number, actual expiry date, and other payment details to the Mastercard™ financial system 105B for processing.

At 8-60, the Mastercard™ financial system 105B receives the actual Mastercard™ primary account number, expiry date, CCV2 number, and other payment details, and verifies if the transaction should be approved. The transaction is approved or declined pursuant to the standard procedures of the financial system 105B. The approval or rejection of the transaction by the Mastercard™ financial system 105B is made known to the wallet server 130, who in turn informs the vendor/vendor's payment portal 155/160. Accordingly, the user's transaction with the vendor 155 is correspondingly approved or declined.

Figure 9:
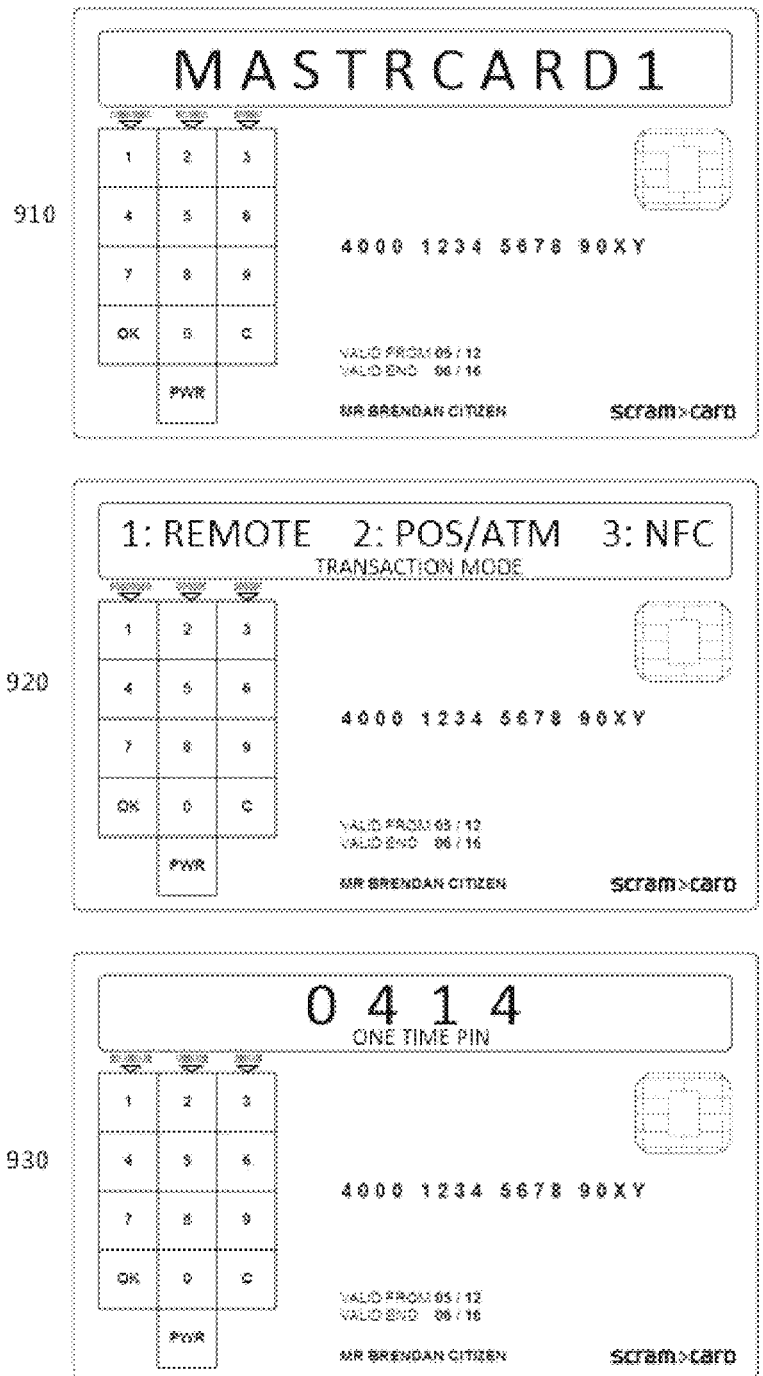
FIG. 9 illustrates displays of the multi-scheme payment integrated circuit card in a POS/ATM transaction mode.
Figure 10:
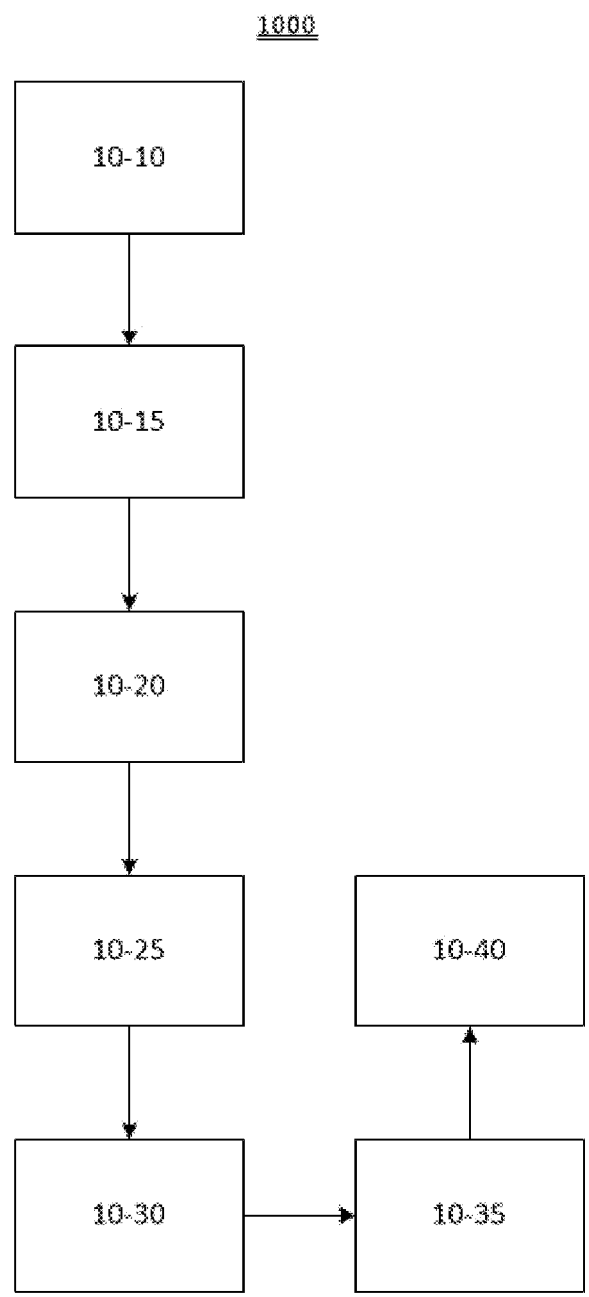
FIG. 10 is a flow chart describing a POS/ATM transaction operation using a multi-scheme payment integrated circuit card according to the present invention.

With reference to FIGS. 9 and 10, an operation 1000 for making a point-of-sale transaction using the payment IC card 110 is described. A point-of-sale transaction, for the purposes of this description, is one where the payment IC card 110 is physically presented to the vendor 155, such as when used with a vendor's POS device 150.

For convenience of description, it is assumed in the following description that the user 120 desires to effect payment by way of their Mastercard™ credit card which has been linked to button '4' of their payment IC card 110. It is to be understood, however, that the invention is not so limited, and that the following operation 800 is applicable regardless of which payment scheme is used, and which button of the payment IC card 130 is activated.

The operation 1000 commences at 10-10, where the user 120 is prompted by the vendor to present their payment IC card 110 to effect payment.

At 10-15, the user 120 selects one of the payment schemes 100A-D linked to the user's payment IC card 110 to effect payment. Accordingly, the user 120 presses button '4' using the keypad 220.

At 10-20, upon pressing button '4', the display 210 displays "MASTRCARD1", as illustrated by screen 910 (FIG. 9), to confirm to the user 120 that button '4' corresponds to their Mastercard™ account. The user 120 is then prompted to indicate to the payment IC card 110 what kind of transaction is to be conducted, as exemplarily illustrated by screen 920 (FIG. 9). Accordingly, the user 120 in this example indicates to the card that a point-of-sale transaction is to be made. This indication may be made by way of a manipulation of the keypad 220 in a known sequence. In a preferred form, the button '2' is pressed to indicate a point-of-sale transaction.

At 10-25, the user 120 validates their authority to use the payment IC card 110. The user's authority may be validated conventionally, for example by way of the insertion or swiping of the payment IC card 110 into the POS device 150, subsequently entering a PIN into the POS device 150, and offline or online verification of the PIN. In a preferred form, however, the user's authority is validated using a dynamic one-time PIN as illustrated by screen 930 (FIG. 9). The use of a dynamic one-time PIN to validate the user's authority is described in the Applicant's PCT application no. PCT/

AU2012/000110 (now published as WO/2012/106757), the contents of which are herein incorporated by reference.

At 10-30, upon successful validation of the user's authority, details of the payment IC card 110 and other payment details are read or entered into the POS device 150 and sent to the wallet server 130. In particular, the PAN corresponding to button '4' of the payment IC card 110 is sent to the wallet server 130.

At 10-35, the wallet server 130 receives the PAN and payment details, and derives from the PAN that the user 120 pressed button '4'. Accordingly, the wallet server 130 retrieves the user's Mastercard™ account details and provides the account details and payment details to the Mastercard™ financial system 105B for processing.

At 10-40, the Mastercard financial system 105B processes the transaction and either accepts or declines the transaction pursuant to their standard procedures. A notification of acceptance or rejection of the transaction is then provided back to the wallet server 130, who in turn notifies the vendor/POS device 150.

Figure 11:
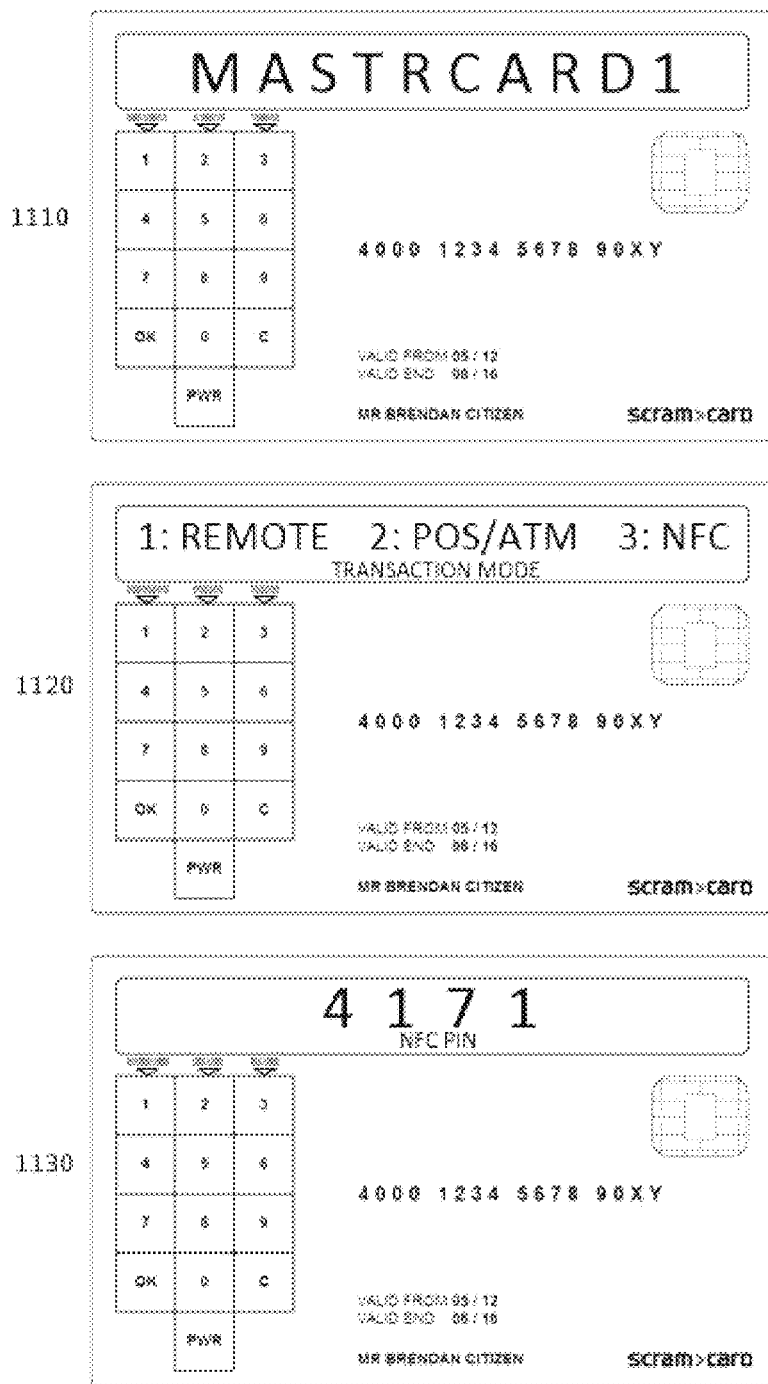
FIG. 11 illustrates displays of the multi-scheme payment integrated circuit card in an NFC tap transaction mode.
Figure 12:
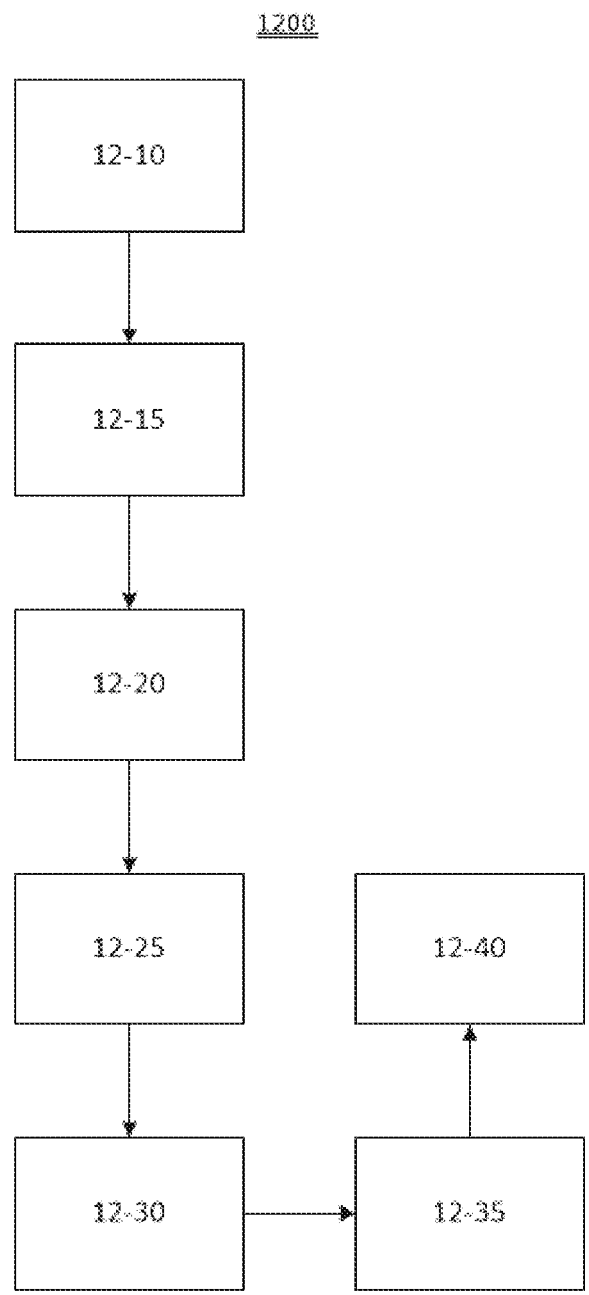
FIG. 12 is a flow chart describing an NFC tap transaction operation using a multi-scheme payment integrated circuit card according to the present invention.

With reference to FIGS. 11 and 12, an operation 1200 for making an NFC tap transaction is described. An NFC tap transaction, for the purposes of this description, is one where the payment IC card 110 is physically presented to the vendor 155, similar to that of an POS/ATM transaction but where the payment IC card 110 communicates to the POS device 150 by Near Field Communication (NFC) technology rather than the payment IC card 110 being read by insertion into the POS device 150.

For convenience of description, it is assumed in the following description that the user 120 desires to effect payment by way of their Mastercard™ credit card which has been linked to button '4' of their payment IC card 110. It is to be understood, however, that the invention is not so limited, and that the following operation 800 is applicable regardless of which payment scheme is used, and which button of the payment IC card 130 is activated.

The operation 1200 commences at 12-10, where the user 120 is prompted by the vendor 155 to present their payment IC card 110 to effect payment.

At 12-15, the user 120 selects one of the payment schemes 100A-D linked to the user's payment IC card 110 to effect payment. Accordingly, the user 120 presses button '4' using the keypad 220.

At 12-20, upon pressing button '4', the display 210 displays "MASTRCARD1", as illustrated by screen 1110 (FIG. 11), to confirm to the user 120 that button '4' corresponds to their Mastercard™ account. The user 120 is then prompted to indicate to the payment IC card 110 what kind of transaction is to be conducted, as exemplarily illustrated by screen 1120 (FIG. 11). Accordingly, the user 120 in this example indicates to the card that a NFC tap transaction is to be made. This indication may be made by way of a manipulation of the keypad 220 in a known sequence. In a preferred form, the button '3' is pressed to indicate an NFC tap transaction.

At 12-25, the user 120 is prompted by the payment IC card 110 to enter a PIN, as illustrated by screen 1130 (FIG. 11). The PIN validates the user 120 to the payment IC card 110, thereby authorizing and unlocking the NFC function of the payment IC card 110 to conduct an NFC transaction. The requirement for the PIN secures the payment IC card 110 from unauthorized NFC transactions.

At 12-30, upon successful validation of the user's authority to conduct an NFC transaction, the user 120 positions the payment IC card 110 in the vicinity of a NFC enabled POS device 150. Details of the payment IC card 110 and other payment details are transmitted to the POS device 150 via NFC communications, and subsequently sent by the POS device 150 to the wallet server 130. In particular, the PAN corresponding to button '4' of the payment IC card 110 is sent to the wallet server 130.

At 12-35, the wallet server 130 receives the PAN and payment details, and derives from the PAN that the user 120 pressed button '4'. Accordingly, the wallet server 130 retrieves the user's Mastercard™ account details and provides the account details and payment details to the Mastercard™ financial system 105B for processing.

At 12-40, the Mastercard financial system 105B processes the transaction and either accepts or declines the transaction pursuant to their standard procedures. A notification of acceptance or rejection of the transaction is then provided back to the wallet server 130, who in turn notifies the vendor/POS device 150.

The system 10, payment IC card 110, and use thereof according to the present disclosure enables the user 120 to effect payment via multiple payment schemes 100A-D that the user 120 has accounts with, using a single card. The payment IC card 110 stores therein a plurality of payment IC card extension numbers used to generate a plurality of unique PANs, one for each button on the payment IC card 110 that may be linked with a payment scheme account. Each PAN corresponds with a payment scheme account stored in the wallet server 110. The payment IC card extension numbers, when substituted for the variable digits in the payment IC card number 240, form the PANs issued to the wallet card 110 by the payment standard and identify to the wallet server 130 which button has been pressed by the user 120. Accordingly, the wallet server 130 is able to retrieve the actual account details for the payment scheme account corresponding to the identified button and submit the actual account details to the appropriate financial system 105A-D for processing.

The PANs conform to the payment standard, for example the Mastercard™ standard. The PANs are selected by the wallet provider from a range of numbers dictated by the standards provider (e.g. Mastercard™), and accordingly, each PANs is a valid number recognizable by any POS device or payment system that accepts the standard. In a preferred form of the present invention, up to ten valid PANs are selected by the wallet provider to be issued with each payment IC card 110.

From the vendor's/POS device's point of view, the user 120 is effecting payment by the payment scheme represented by the PAN (e.g. Mastercard™), even if a different payment scheme is contacted by the wallet server 130 to make payment. Accordingly, the present invention further allows the user 120 to pay by a preferred, though less widely accepted, payment scheme such as American Express™, even when the vendor 155 does not accept payment by that payment scheme.

Advantages

The advantages of the present invention include the ability for users to transact using any payment scheme with which they have an account, from a single card. Accordingly, there is no longer the need for users to carry with them multiple cards.

Moreover, the present invention allows users to essentially transact with a vendor using a payment scheme that the vendor does not accept. Accordingly, payment schemes such as Diners Club™ and American Express™ which tend to offer better incentives to users but which are not widely accepted, my still be used by users at vendors which do not accept such payment schemes.

The present invention further obviates the need for collaboration or agreement between the various payment schemes. The technological solution presented by the present invention hence renders feasible what would otherwise be, from a business perspective, an unfeasible solution.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The claims defining the invention are as follows:

1. A system for effecting electronic payments via multiple payment schemes from a single payment integrated circuit (IC) card, the system comprising:
    a payment IC card conforming to a payment card standard, the payment IC card being issued with a plurality of primary account numbers (PANs) from the payment card standard;
    a wallet server storing account details of one or more payment schemes with which a user has an account; and
    a vendor payment system configured to accept transactions using the payment card standard;
    wherein the payment IC card is operable to transact with the vendor payment system using the payment card standard; and
    the vendor payment system is operable to provide to the wallet server one of the primary account numbers (PANs) issued to the payment IC card to effect a financial transaction via one of the payment schemes with which the user has an account.

2. The system according to claim 1, wherein the wallet server is connected to financial systems of each payment scheme with which the user has an account.

3. The system according to claim 1, wherein the wallet server is operable to provide the account details of the payment scheme the user intends to conduct a transaction with to a corresponding financial system of the payment scheme to request payment from the user to the vendor payment system.

4. The system according to claim 1, wherein the wallet server is operable to provide the account details of the payment scheme the user intends to conduct a transaction with to a corresponding financial system of the payment scheme to request payment from the user to the vendor payment system and the wallet server is operable to receive, from the financial system, an approval or rejection of the request for payment, and inform the vendor payment system of the same.

5. The system according to claim 1, wherein the payment IC card is provided with a plurality of presets, and each preset is associated with one of the plurality of primary account numbers (PANs) issued to the payment IC card.

6. The system according to claim 1, wherein the payment IC card is provided with a plurality of presets, and each preset is associated with one of the plurality of primary account numbers (PANs) issued to the payment IC card; the wallet server is accessible by the user to pair each payment scheme whose details are stored therein with a preset, and the wallet server is further operable to generate an activation code for the pairing.

7. The system according to claim 1, wherein the payment IC card is operable by the user to indicate by which payment scheme the user intends to conduct the transaction.

8. The system according to claim 1, wherein the payment IC card is provided with a plurality of presets, each preset is associated with one of the plurality of primary account numbers (PANs) issued to the payment IC card; and
    the payment IC card is provided with a display, the display is operable to display one of the plurality of primary account numbers (PANs), or a portion thereof, upon operation of a preset and input of a security code by the user.

9. The system according to claim 1, wherein the payment IC card is provided with a plurality of presets, each preset is associated with one of the plurality of primary account numbers (PANs) issued to the payment IC card; and
    the payment IC card is further operable to receive a PIN entered by the user, and generate a card code verification number based on the received PIN.

10. The system according to claim 6, wherein the payment IC card is operable to receive from the user an indication of a preset of the payment IC card to activate, and a code for activating the preset, and further operable to compare the received code with the activation code;
    the payment IC card, upon activation of a preset, is operable to provide to the wallet server the primary account number (PAN) associated with the preset and the wallet server;
    upon receipt of the primary account number (PAN) associated with the preset, is operable to retrieve the account details of the payment scheme paired to the present, and provide the account details to the financial system of a corresponding payment scheme.

11. A payment integrated circuit (IC) card suitable for use with a wallet server that stores account details of one or more payment schemes with which a user has an account, comprising:
    the payment IC card conforming to a payment card standard configured to allow a vendor payment system to accept transactions, the payment IC card being issued with a plurality of primary account numbers (PANs) from the payment card standard, wherein the payment IC card is operable to use the payment card standard in transacting with the vendor payment system and wherein the vendor payment system is operable to provide to the wallet server one of the primary account numbers (PANs) issued to the payment IC card to effect a financial transaction via a one of the payment schemes with which the user has the account, wherein the payment IC card comprises:
        one or more user activatable presets each paired to a unique primary account number (PAN) issued by a payment card standard; wherein the payment IC card is configured to produce the unique primary account number (PAN) paired to a first preset of the one or more user activatable presets upon an authorized operation of the first preset.

12. The payment IC card according to claim 11, wherein the payment IC card is configured to operate in a first mode where a PIN is received from a user, and the payment IC card generates a security number using the received PIN, a current time, the preset being operated, and a pre-stored random seed.

13. The payment IC card according to claim 11, wherein the payment IC card is configured to operate in a first mode where a PIN is received from a user, and the payment IC card generates a security number using the received PIN, a current time, the preset being operated, and a pre-stored random seed;

the payment IC card is further adapted, in the first mode, to produce an extension number for combining with a partial card number to produce the unique PAN paired with the preset being operated.

14. The payment IC card according to claim 11, wherein the payment IC card is configured to operate in a second mode where the payment IC card is inserted into a card reader, and a unique primary account number (PAN) paired to a preset being operated is read from the payment IC card and sent by the card reader to a server, and the server being managed by an issuer of the payment IC card.

15. The payment IC card according to claim 11, wherein the payment IC card is configured to operate in a third mode where the user validates their authority with the payment IC card, and upon validation the payment IC card unlocks an NFC communication mode allowing a unique primary account number (PAN) paired to a preset being operated to be sent via NFC communication to an NEC card reader, and thereby to a server, the server being managed by an issuer of the payment IC card.

16. The payment IC card according to claim 11, wherein the payment IC card is at least one of:
   preprogrammed with an activation code for activating each of the presets;
   operable to receive an activation code from the user to activate a preset for use with a predetermined electronic payment scheme;
   or operable to receive an activation code from the user to activate a preset for use with a predetermined electronic payment scheme, the payment IC card is operable to determine from the activation code a type of payment scheme being activated therewith.

17. The payment IC card according to claim 11, wherein the payment IC card comprises at least one of:
   a display;
   a keypad; or
   an interface for interfacing a processor of the card with a card reader.

18. The payment IC card according to claim 11, wherein the payment IC card has presented on a surface thereof a part of a card number, the part of the card number corresponding to digits of each paired primary account number (PAN) that are common to each paired primary account number (PAN).

19. A method for conducting an electronic funds transaction over one of a plurality of payment schemes from one payment IC card, the method comprising:
   pairing a payment scheme account with a preset on a server;
   generating an activation code for the pairing; and
   entering the activation code into the payment IC card in relation to a corresponding preset on the payment IC card;
   wherein a transaction operation involving the payment IC card causes a primary account number (PAN) associated with the preset to be sent to the server, and causes the server to send details of the payment scheme account paired with the preset identified by the primary account number (PAN) to a financial system of a payment scheme corresponding to the payment scheme account.

20. The method according to claim 19, further comprising a step of receiving an input from a user indicating if a transaction to be conducted is a remote transaction or a point-of-sale transaction.

21. The method according to claim 19, wherein when applied to a remote transaction, further comprising:
   receiving an input indicative of which preset is to be used for the remote transaction;
   receiving a PIN and producing a primary account number (PAN) or a part thereof, together with a security number, wherein the primary account number (PAN) is one of a plurality of primary account numbers (PANs) pre-issued by a payment standard to the payment IC card, and the security number is generated from the PIN;
   providing the primary account number (PAN) and the security number to a vendor payment system to effect transaction using the payment standard;
   processing the transaction in accordance with procedures set by the payment standard, and providing the primary account number (PAN) and security number to the server; and
   determining from the primary account number (PAN) which preset has been selected, determining which payment scheme account has been paired with the preset, and providing to the financial system of the payment scheme corresponding to the payment scheme account details of the payment scheme account.

22. The method according to claim 19, wherein when applied to a point-of-sale transaction, further comprising:
   receiving an input indicative of which preset is to be used for the point-of-sale transaction;
   receiving an authorizing PIN;
   reading the payment IC card using a card reader; and
   providing a primary account number (PAN) corresponding to the preset to the server.

23. The method according to claim 22, further comprising determining, from the received primary account number (PAN), which preset has been selected, determining which payment scheme account has been paired to the preset, and providing to the financial system of the payment scheme corresponding to the payment scheme account details of the payment scheme account.

24. The method according to claim 23, wherein when applied to an NFC transaction, further comprising:
   receiving an input indicative of which preset is to be used for the NFC transaction;
   receiving an authorizing PIN;
   unlocking an NFC communication means integrated in the payment IC card upon validation of the authorizing PIN;
   transmitting a primary account number (PAN) corresponding to the preset via NFC to an NFC card reader; and
   providing the primary account number (PAN) to the server.

* * * * *